United States Patent [19]

King

[11] 4,386,995

[45] Jun. 7, 1983

[54] LABEL DISPENSER MAGAZINE

[75] Inventor: George W. King, Stouffville, Canada

[73] Assignee: Canadian Stackpole Limited, Scarborough, Canada

[21] Appl. No.: 245,905

[22] Filed: Mar. 20, 1981

[51] Int. Cl.³ ........................ B32B 31/00; B65C 9/40; B65C 9/08

[52] U.S. Cl. .................................... 156/362; 156/366; 156/497; 156/564; 156/570; 156/DIG. 30; 221/45

[58] Field of Search ............... 156/378, 444, 362, 539, 156/573, 497, 584, 475, DIG. 29, DIG. 30, DIG. 31, DIG. 38, DIG. 45, 364, 366, 367, 564, 569, 570, 571, 572, 285, 297; 118/243; 221/45, 190, 270, 278, 296, 311

[56] References Cited

U.S. PATENT DOCUMENTS

| | | | |
|---|---|---|---|
| 2,226,626 | 12/1940 | Mann | 221/311 |
| 4,025,385 | 5/1977 | Wood | 156/DIG. 31 |
| 4,289,562 | 9/1981 | Chisolm | 156/DIG. 31 |
| 4,293,365 | 10/1981 | Geyser et al. | 156/DIG. 31 |

*Primary Examiner*—Edward C. Kimlin
*Assistant Examiner*—Louis Falasco

[57] ABSTRACT

A label magazine for supplying labels to a labeller has a label stack tray, a label picker for withdrawing individual labels from the stack and a device for advancing the stack of labels towards the label picker. The device for advancing the labels exerts a repetitive varying pressure on the label stack to advance it by alternately increasing pressure on the stack of labels for compressing same and subsequently reducing the pressure on the stack of labels.

9 Claims, 8 Drawing Figures

LABEL DISPENSER MAGAZINE

FIELD OF THE INVENTION

This invention relates to label magazines and in particular label magazines which may be used to supply labels to a labelling apparatus which applies such labels to articles.

BACKGROUND OF THE INVENTION

Label magazines are commonly used to provide a supply of labels for an apparatus which applies labels individually to articles such as, labellers used to apply labels to containers in the packaging industry. An example of such a label magazine is disclosed in U.S. Pat. No. 3,450,586. A stack of labels is placed in the label magazine where a device is provided for advancing the stack of labels towards the label picker for removing the labels individually from the magazine. The labels are advanced by the use of a coiled spring which biases a plate against the stack of labels which in turn continually pushes the stack of labels against the label picker. Such system has proven satisfactory, however, in some situations depending upon the type of label to be dispensed, the working environment, the diecutting of the stack of labels, and surface coatings on the labels can all cause the labels to stick to one another which results in a problem in removing labels individually from the magazine. The above problem is aggravated by the use of the system of the above U.S. patent which continuously applies a relatively constant pressure on the stack of labels for pushing them against the label picker.

Considering the aspects which cause the labels of a stack to stick to each other, in the diecutting of the labels in a one stroke press, if the cutting dyes become blunt this can cause labels of the stack to become physically attached to another. In the printing of labels, the speeds of production demand that sheets of labels be stacked together possibly before the printing inks are totally dry. Embossed designs tend to mechanically lock individual labels together. Gold effect finishings on labels can result in a sticky surface which can cause adherance of labels in the stack. Surface coatings on the labels which seal the printed face can also cause an imbalance in the paper stock so that humidity variations can cause bending or curving of the labels. It has been found that the continual pressure on a stack of labels having one or more of the above drawbacks, in a dispensing magazine significantly increases the problem of separating individual labels from the face of the label stack.

Other systems used for advancing labels in a label magazine involve vibrating devices. It has been found however that with the use of vibrating systems the continual high frequency vibration for advancing the labels toward the picking device causes substantial compaction in the stack of labels and thus results in the same problem of interfering with the ease in separating individual labels from the face of the label stack. In addition, the vibrating mechanism tends to shock the magazine and cause a mechanical loosening or freting of the magazine components and wearing of contacting faces of the components. Examples of such vibrating mechanisms as used in advancing sheets in a stack of sheets are disclosed in U.S. Pat. Nos. 3,334,890 and 3,545,741.

This invention provides a system for advancing the labels in a manner which provides for an intermittent force on the label stack to advance same without aggravating the problem of removal of individual labels from the stack, and thereby provide a more reliable label dispensing.

SUMMARY OF THE INVENTION

The label magazine for supplying labels to a label applying machine has means for supporting a stack of labels, means for withdrawing individual labels from the supported stack of labels and means for advancing a stack of labels on the support means towards the means for withdrawing labels from the stack. The advancement means exerts a repetitive varying pressure on the stack of labels so as to advance them by alternately increasing pressure on the stack of labels for compressing same and subsequently reducing the pressure on such stack of labels.

Such alternate increase and decrease in pressure advances labels in a manner to ensure that the stack of labels is adjacent the means for withdrawing labels individually from the stack. Such variation in pressure when considered over time, provides a reduced pressure on the label stack as compared to prior devices so as to permit easier separation of labels which due to one or more of the earlier mentioned processing steps have become adhered or stuck to one another. Considering the high speeds at which labels may be withdrawn from the stack, the duration which the label stack is under pressure and is having a label withdrawn therefrom may be for minor portions of the magazine operation time. Thus the remainder of the time the labels are not under pressure and are easily separated and removed from the magazine. In situations where the label stack is being compressed and a label being removed, such pressure is usually only equivalent to the pressure normally used on prior systems for advancing the labels. When the pressure is reduced again, the stack may resume a more relaxed position allowing any disruption in the face of the label stack to correct itself.

The means for advancing the stack of labels may exert sufficient pressure on the stack of labels to overcome forces reacting against advancement of the stack of labels. The advancement means may vary pressure on the stack of labels from a level which compresses the stack of labels down to a level which permits the compressed stack of labels to relax or in a situation where the pressure is removed from the stack, allows such compressed stack of labels to expand.

Such improved label magazine having a device for providing a pulsating pressure on the stack of labels may be timed such that during a majority of the time there is little if any pressure on the stack of labels. This substantially improves the operation of the device for withdrawing labels individually from the stack because with the lack of pressure on the label being withdrawn, it may be easily picked from the stack of labels by conventional label picking devices.

DESCRIPTION OF THE DRAWINGS

Preferred embodiments of the invention are shown in the drawings wherein.

DETAILED DESCRIPTION OF THE PREFERRED EMBODIMENTS

Figure 1:
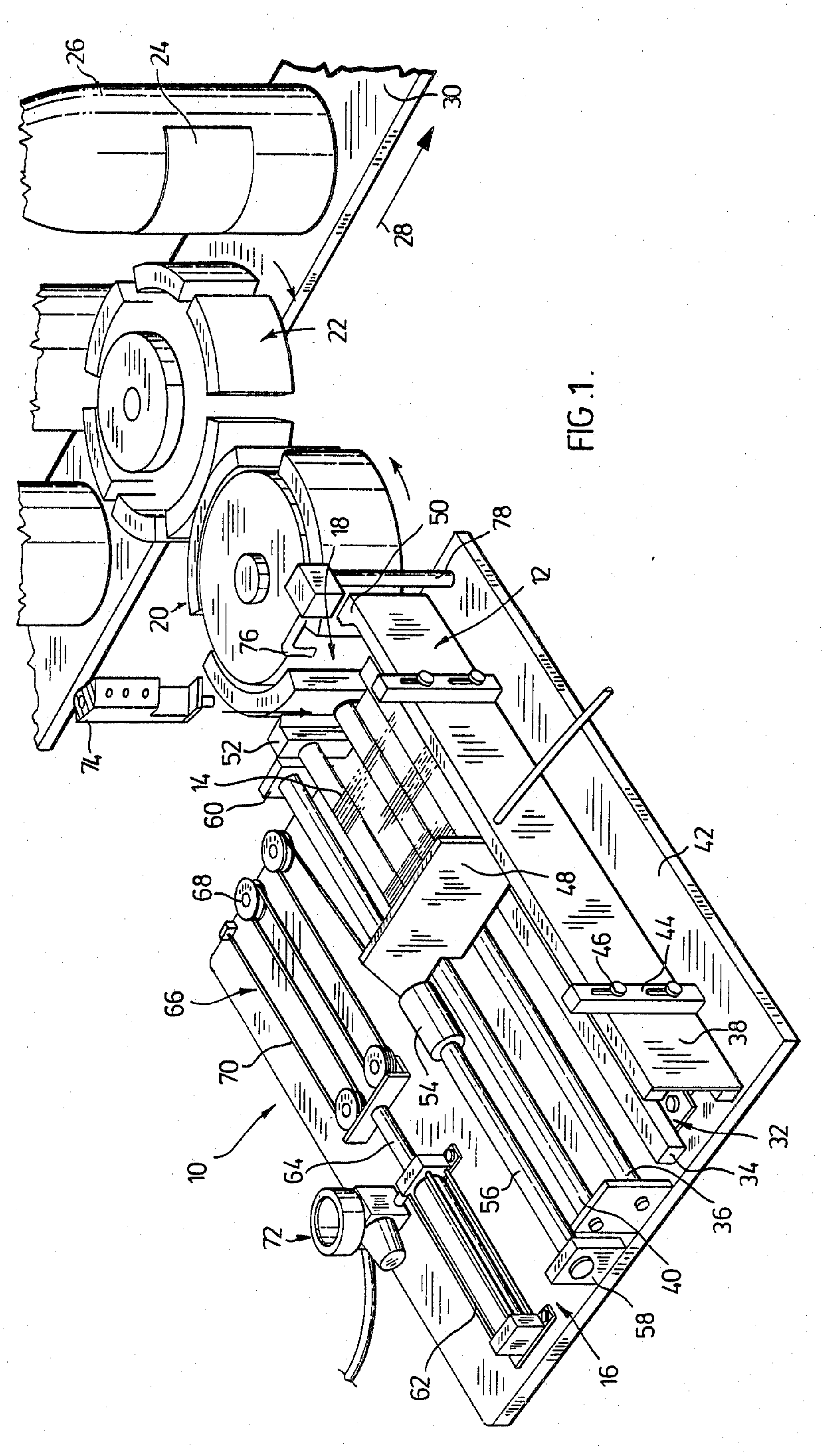
FIG. 1 is a perspective view showing a label magazine for supplying labels to a labelling apparatus which applies individually withdrawn labels to conveyed containers.

FIG. 1 shows a label magazine 10 which has a support or tray 12 for supporting a stack of labels 14. The label magazine includes a device generally designated at 16 for advancing the stack of labels 14 toward the discharge area generally designated 18 of the label magazine 10. A revolving gripper drum schematically shown at 20 removes individual labels from the stack of labels 14 and transfers them to a label applicator drum schematically shown at 22 which is timed to apply the individual labels 24 to evenly spaced apart conveyed containers 26 which are conveyed in the direction of arrow 28 by conveyor 30.

The support or tray 12 of the magazine comprises a base portion 32 which according to this embodiment is formed with spaced apart rods 34 and 36. Guide rails are provided in the form of rail arrangements 38 and 40. Rail arrangement 38 is stationary as secured to the label magazine base plate 42 by standards 44 which permit elevation adjustment of the guide rail arrangements 38 by way of the combination bolt and slots 46 in the standards 44. The rod 36 and rail 40 are jointly adjustable laterally relative to fixed guide rail 38 to accomodate varying widths of labels. The stack of labels 14 rest on the base 32 and the stack integrity is maintained by the guide rails 38 and 40 as the stack 14 is contained between the label withdrawal area 18 and a device in the form of a plate 48 which is used to push the stack of labels 14.

In the label withdrawal or discharge area 18, an arrangement is provided for retaining the stack of labels in the magazine. According to this preferred embodiment the retaining device comprises spaced apart ramp portions 50 and 52 details of which are shown in FIGS. 2 and 3.

The plate 48 includes a sleeve 54 mounted on rod 56 which in turn is mounted on the base plate 42 by standards 58 and 60. To advance the stack of labels 14 towards the magazine retaining ramps 50 and 52, the device 16 includes a pneumatic piston and cylinder arrangement 62. The piston shaft 64 is connected to a mechanism 66 which translates the piston movement into a force on the sleeve 54 which pulls the pusher plate 48 against the stack of labels 14. The mechanism 66 consists of a plurality of pulleys 68 and cable 70 such that when the piston rod 64 is retracted into cylinder 62, such retraction is translated into a pull on the sleeve 54 which pushes the pusher plate 48 towards the magazine retaining ramps 50 and 52. The use of the pulleys 68 act to reduce the force of the retracting piston rod 64 to an acceptable force on the pusher plate 48. An air pressure regulator 72 is provided to regulate the air pressure on the cylinder 62. The regulator 72 in combination with the mechanism 66 provides the desired upper level of pressure on the stack of labels.

In the area of the label withdrawal a pivotable vacuum bar 74 is provided to pick from the face of the stack 14 an edge of the label from behind the ramp 50. The edge is now presented for removal by the gripper drum 20 which draws the picked label from the discharge ramp 52. To assist in separation of the labels in the picking area an air blast is provided by downwardly depending duct 76 which is connected to an air supply hose 78.

Figure 2:
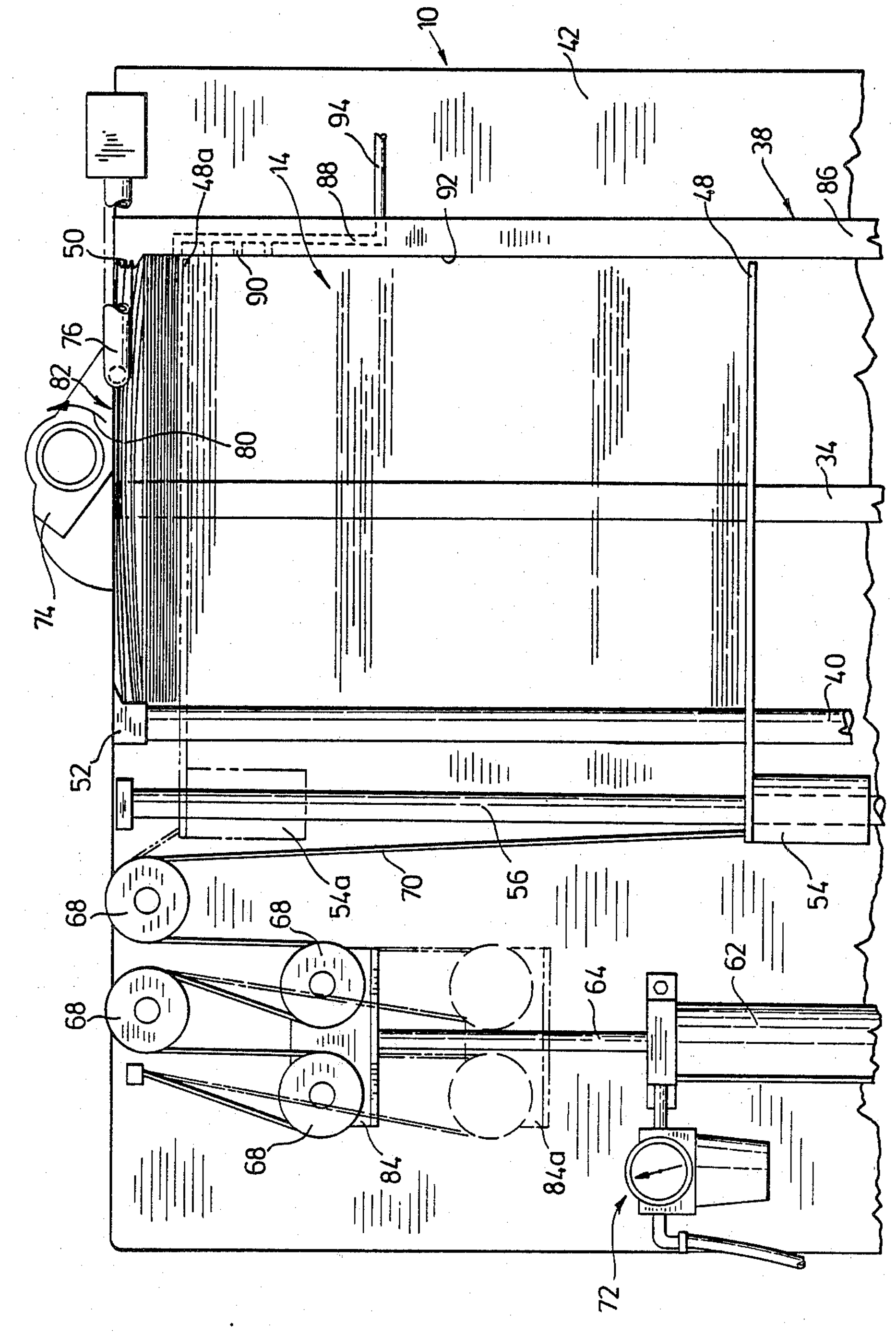
FIG. 2 is a plan view of the label magazine of FIG. 1.
Figure 3:
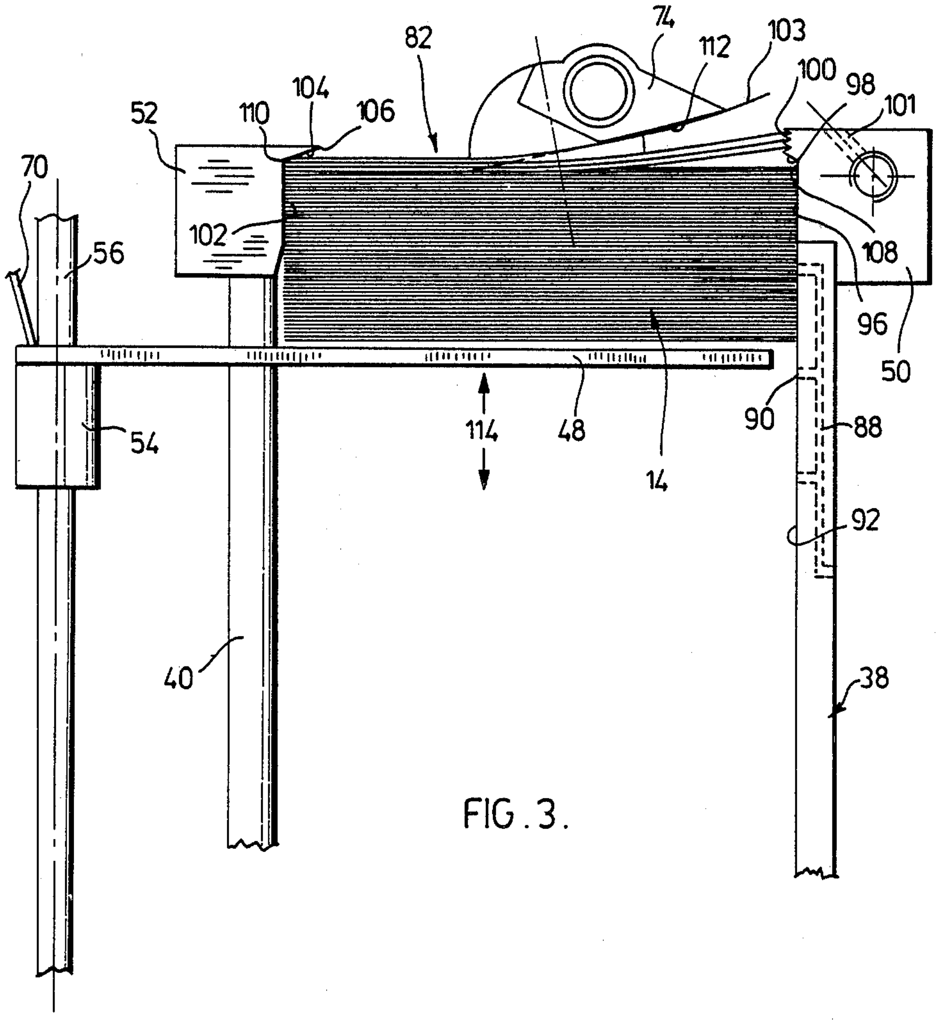
FIG. 3 is a partial plan view of the label magazine of FIG. 1 showing in greater detail aspects of label withdrawal.

Referring to FIG. 2 the label magazine 10 has a relatively large stack of labels 14 located therein in the first position for the pusher plate 48. The vacuum bar 74 pivots in the direction of arrow 80 to remove individual label edge from behind ramp 50 to present such edge outwardly from the face generally designated 82 of the stack 14. The pusher plate 48 urges the stack 14 towards the ramps 50 and 52 until the pusher plate eventually achieves a second position as shown at 48A. The extent of retraction of the piston rod 64 is shown as depicted by the two positions of the plate 84 and 84A which is connected to the rod 64 and has two of the pulleys 68 rotatably mounted thereon. As the pusher plate 48 advances the stack of labels 14, it does so in accordance with the invention so as to pulse or intermittently apply a pressure against the stack 14 to momentarily compress and then allow the stack of labels to relax as they are advanced towards the magazine retaining members 50 and 52.

The guide rail arrangement 38 includes rail 86. This particular rail is provided with an internal duct as shown in dotted lines at 88 which includes outlet ports at 90 on its inner face 92. A supply of pressurized air to duct 88 is provided by air supply hose 94. The pressurized air blasts through ports 90 onto the side of the stack of labels 14. Such air blasts from ports 90 are in addition to the air blasts provided by jet 76 to provide air penetration into the stack of labels and commence separation of the the labels prior to the application of downwardly directed air blasts from depending jet 76. Due to the pulsating operation of the pusher plate 48 which compresses the stack of labels and then, according to a preferred embodiment completely removes the pressure on the stack of labels to allow them to relax and expand, the blasts of air from ports 90 penetrate the stack of labels as they relax. This accordian effect in compressing and expanding the labels assists in the air blast penetrating the stack of labels at its forward portion to commence separation of at least the portions of the labels along guide face 92 which are the edge portions of the labels individually and firstly pulled from behind the retaining ramp 50.

During normal operation of the magazine the size of the stack of labels 14 is maintained sufficiently large to always cover the ports 90. Thus only in a rare occasion would the stack of labels be permitted to decrease to the extent as shown by pusher plate 54A since at that time pressurized air would escape through open ports 90. A sensor may be provided to sense the pressure drop in line pressure to ports 90 to actuate an alarm indicating lack of labels and that the magazine must be refilled.

Referring to FIG. 3, an enlarged view of label dispensing is shown. The retainer ramp portion 50 has an inner face 96 which is coplanar with the guide face 92 of guide rail assembly 38. Inner face 96 terminates in a inwardly sloped face 98 which terminates in a toothed faced portion 100. Discharge ramp 52 has an inner face 102 which is coplanar with the inner portion of guide rail 40. The inner face 102 terminates in a sloped face 104 which terminates in a knife edge 106. The juncture of the sloped faces and the inner faces of the ramps 50 and 52 as designated at 108 and 110 lie in the same plane. The vacuum bar 74 has its inner face 112 normally lying in the same plane to position the face 82 of the labels as held at their edges by junctures 108 and 110 against the vacuum bar inner face 112. An additional air blast at 101 blows outwardly the edge 103 of the label removed from behind ramp 50. The tooth portion of face 100 prevents labels behind the label edge 103 being withdrawn following such removal of the leading label edge. With the label pulled outwardly from ramp 50, the gripper drum 20 of FIG. 1 has a mechanism for gripping that edge and pulling the remainder of the label out of the stack away from discharge ramp 52 and across the face 112 of the vacuum bar 74.

By way of the piston and cylinder arrangement and a control on the pressurized air to the cylinder, the plate 48 is pulled toward the ramps 50 and 52 so as to push and thereby compress the stack of labels 14. In exhausting the pressurized air in the cylinder 62 the force on the plate 48 is removed so as to permit the stack of labels 14 to relax and due to its inherent resiliency expand. In operation of the label magazine, there can be seen a reciprocal movement of the plate 48 as exaggerated and shown by arrow 114. Depending upon the characteristics of the stack of labels this will determine the extent to which the stack of labels is compressed and permitted to expand during the cyclical action of the pusher plate 48 compressing the stack of labels. The force with which the plate 48 compresses the stack of labels is sufficient to overcome any forces which react against such movement of plate 48. Such reactive forces may lie in the static frictional forces of the sleeve 54 as it slides on rail 56 and the stack of labels as it frictionally engages the guiderails and bottom of the stack support. Once the force on the plate 48 is sufficient to overcome such static forces the stack of labels is momentarily compressed by such force.

During such compressive force on the stack of labels, the vacuum bar 74 may be removing an edge of a label from the stack face and from behind the ramp 50. However, such a force exerted by the pusher plate 48 is no greater than the force required to overcome reactive static frictional forces which with prior devices was the normal force used to continually push on the stack of labels. Thus that particular label may be picked from the stack even with full compressive force on the stack as has been done with prior devices. This may, in some instances depending upon the characteristics of the label, cause the label behind the label being picked to pucker between the ramps 50 and 52. However, as soon as the force is relieved from the plate 48 the stack of labels relaxes and thus permits any leading label or labels which may be distorted in the stack of labels to resume their somewhat more planer positioning behind the face of vacuum bar 74. This compression and relaxation of the stack of labels therefore significantly assists the picking and removal of individual labels from the label stack.

Figure 4:
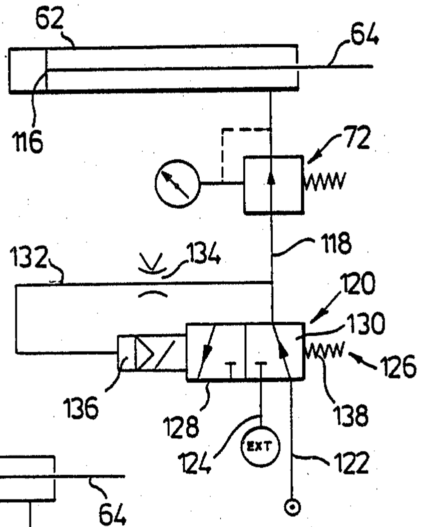
FIG. 4 shows schematically details of a device for advancing a stack of labels in accordance with the invention.

To accomplish this pulsating force on the pusher plate 48, according to a preferred embodiment, the air supply to the air cylinder 62 is controlled. Such a control is shown in FIG. 4. The air cylinder 62 has a piston 116 mounted therein with its piston rod 64 projecting through cylinder 62. The pressure regulator 72 controls the pressure of the pressurized air exerted within the cylinder 62 on the annular face of piston 116 to determine the force with which the rod 64 is retracted into the cylinder to cause an advance of the pusher plate 48 against the ramps 50 and 52. The supply of pressurized air to the presence regulator 72 in the line 118 is controlled by the label stack advancement control 120. The advancement control 120 is connected to a supply of pressurized air in line 122 and an exhaust line is provided at line 124. A directional control valve 126 consists of two parts 128 and 130. The valve 126 is shown in its first position whereby the pressurized air line 122 communicates directly with the regulator 72 to thus provide a regulated pressure within cylinder 62 to cause a retraction of piston rod 64. In so doing a compressive force is exerted on the stack of labels 14.

The control 120 is provided with an additional line 132 which includes a restrictor 134. The restrictor permits a build up of pressure in line 132 until the built up pressure is sufficiently great on a snap action valve 136 to move the valve 126 to its second position. This shifts portion 128 of the valve to close off pressure line 122 and exhaust the air from cylinder 62. As the air exhausts from cylinder 62, the pressure within line 132 bleeds back through restrictor 134 until the pressure has sufficiently decreased on snap action valve 136, that the pressure of spring 138 returns the valve to its first position. This recharges cylinder 62 with pressurized air to enable the sequence to be cyclically repeated.

In this manner a pulsating force is provided on the plate 48 to give a compressive force which compresses the stack of labels and when the valve moves to its second position removes the force on the plate 48 to allow the stack of labels to relax and depending upon their characteristics, expand somewhat. Depending upon the setting for the restrictor 134, this determines the time during which the pressure is on cylinder 62. In providing a single restrictor, the cyclical operation of the control provides approximately equal compressive time on the stack and equal relaxation time for the stack.

Figure 5:
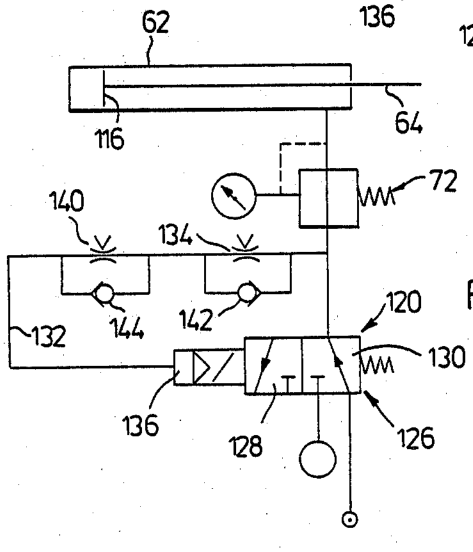
FIGS. 5, 6 and 7 show schematically alternative embodiments of a device for effecting label stack advance in accordance with the invention.

To control the on/off time for the pressure on the plate 48 this may be accomplished by the embodiment of FIG. 5. In the line 132, two restrictors 134 and 140 are provided in parallel with check valves 142 and 144. When the valve 126 is in its first position, as shown, the restrictor 140 determines the rate at which the pressure builds up in line 132 because the flow is through the check valve 142 and through the restrictor 140. As soon as sufficient pressure has built up in line 132, the snap action valve 136 moves the slide valve to the second position and thus exhausts the cylinder 62. The rate at which the pressure in line 132 is exhausted is determined by restrictor 134 because the flow is through check valve 144 and restrictor 134. Thus in varying the settings on restrictors 134 and 140, the time for the "on" portion of the pressure pulse and the "off" portion of the pressure pulse may be adjusted, for example, a very brief "on" portion for the pulse and a long "off" portion for the pulse, may be provided.

This is particularly advantageous in situations where it is desired to simply provide a spike-type pressure pulse on the stack of labels to quickly compress them and remove the pressure from the labels for an extended period of time. The spike pressure on the stack of labels may be timed such that its maximum force is applied on the stack of labels when a label is not being picked depending upon the speed of label picking. Such an arrangement in effect causes an advance of the stack of labels without exerting any pressure on the stack of labels during the time when individual labels are picked from the stack. This approach is particularly advantageous for picking labels which are normally difficult to remove from the stack. Such an example is with the dispensing of small labels with very narrow edges which are subjected to increased pressures at there edges as retained by the ramps 50 and 52 because there is normally a predetermined pressure exerted on the plate 48 to overcome the frictional forces. With the embodiment of FIG. 5 and in timing the pulses, a smoother dispensing of individual small labels from the stack is achieved.

The frequency of the pressure pulses on the pusher plate as determined by the advancement control may vary considerably depending upon the resiliency of the label stack, the type of magazine, the speed at which labels are withdrawn from the stack, to name only a few considerations. For example, with some stacks of labels which are fairly resilient in nature and the labels are withdrawn from the stack at only 60 labels per minute it may only be necessary to apply a compressive force on the label stack once every 30 seconds. However, with the same stack and labels are withdrawn at a rate of 240 labels per minute it may be necessary to apply a compressive force on the label stack as often as every 5 to 10 seconds. It has been found that with the label withdrawal arrangement of FIG. 3, the unit may be run at high labelling speeds of 200 to 300 labels per minute and maintain sufficient stack advance by applying a pressure pulse every 15 seconds. The use of the vacuum bar and the air blasts on the stack of labels in the relaxed state provides a very uniform label dispensing even between the extended intervals of spaced out pressure pulses on the stack.

Figure 6:
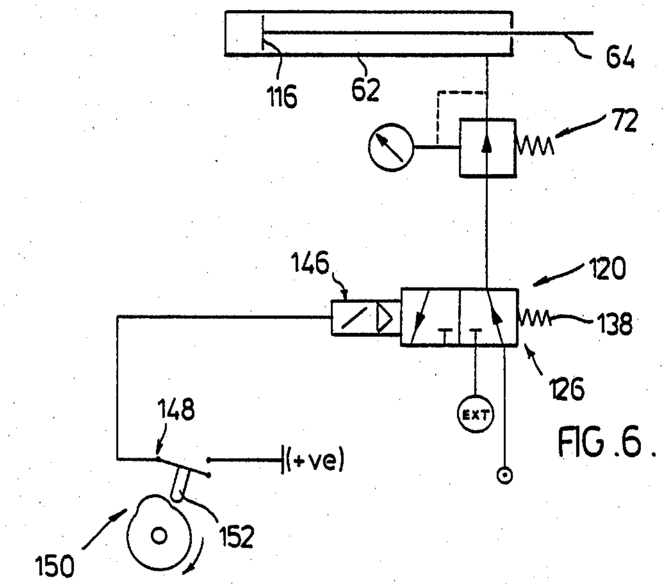

The control system 120 for the pressure on the cylinder 62 may be electrically controlled as shown in FIG. 6. The valve 126 has an electro-mechanical solenoid 146 which shifts the valve 126 from its first to second and vice versa positions. The solenoid 146 is controlled by a switch 148 which is moved to its "on" and "off" positions by rotating cam arrangement 150. As the cam 150 strikes arm 152 it closes the switch 148 to extend the solenoid 146 to move the valve 126 to its second position which exhausts the cylinder 62. With the cam arrangement shown the "on" portion of the cycle is considerably longer than the "off" portion of the cycle. This may be useful in situations where the stack of labels is very compressible requiring a extended "on" time to sufficiently compress the labels to achieve proper advancement thereof. It is appreciated that the shape of the cam 150 may be altered to change the durations of the "on" and "off" portions of the cycle in pulsing the pusher plate 48. In addition it is appreciated that the rotation of the cam 150 may be timed to provide pressure pulses at moments when labels are not being picked; or minimize the number of times that the pressure pulses are being applied when labels are being picked so that in a majority of the instances the stack of labels is in its relaxed condition so that the front label may be usually very easily withdrawn from the stack.

Figure 7:
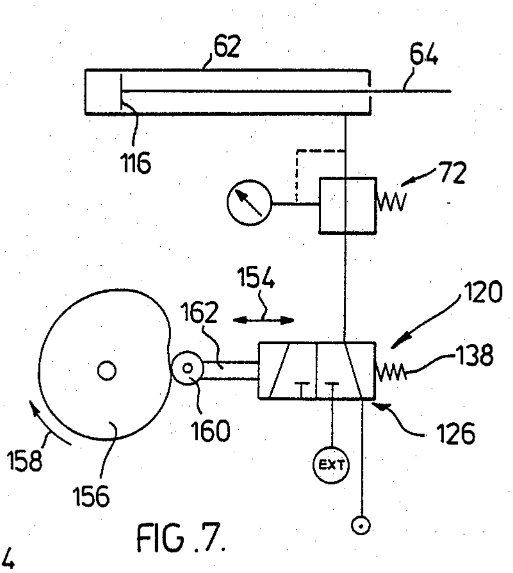

A mechanical arrangement for controlling the operation of the piston and cylinder is shown in FIG. 7. The valve 126 is reciprocated in the directions of arrow 154 by a cam 156 rotated in the direction of arrow 158 as it contacts a follower 160 secured to rod 162. The rotating cam 156 shifts the valve 126 from its first position to its second position and a spring 138 moves it back again. Now with the particular shape of cam 156 it can be seen that the "off" portion of the cycle is greater than the "on" portion. This may be altered by changing the shape of the cam 156, and the rate at which the cam is rotated. The cam rotation may be timed with the rate at which the labels are picked to decrease the occasions where the stack of labels is being compressed as a label is withdrawn from the stack.

Figure 8:
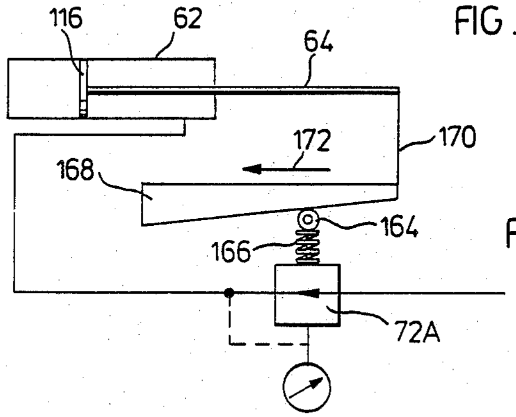
FIG. 8 shows schematically a system for decreasing magnitude of pressure pulses on the stack of labels as the stack decreases in size.

As the stack of labels decreases in size less pressure is actually required to compress the stack of labels since there are less labels to advance towards the retaining ramps of the label magazine. Therefore, the control system may be adapted to reduce the pressure applied to the stack of labels as the pusher plate 48 gets closer to the retaining ramps. This may be accomplished by an inter-relationship between the position of the piston rod 64 and a device which alters the setting on pressure regulator 72 so as to decrease pressure in the cylinder as the size of the stack is decreased. Such a system is shown in FIG. 8. Normally with the pressure regulator 72 of FIG. 4, the spring at its side may be adjusted by a threaded knob to reduce the spring pressure on the valve component to reduce the pressure on the outlet side of the regulator. This manual adjustment may be automated by the arrangement of FIG. 8 to automatically reduce the pressure of the repetitive compressive pressure on the stack as the stack size decreases. The regulator 72A has a cam follower 164 located on its spring 166. The cam follower 164 contacts a cam which is fixed to piston rod 64 by arm 170. As the rod 64 is retracted into the cylinder 62 due to a decrease in size of label stack in the magazine, the cam 168 moves in the direction of arrow 172 to decrease the pressure on spring 166 and thereby proportionately decrease the pressure on the annular face 116 of the piston. This reduction in pressure on the piston is translated into a reduced pressure pulse on the stack of labels where such pressure is still sufficient to overcome the forces reacting against stack advance by the stack of the reduced size.

In addition the control for the pressure on the cylinder 62 may be varied in a manner so as to provide a pressure on the plate which may be in the form of a spike or resemble a portion of a sine wave. A spike force pulse may be used to quickly increase the pressure on the stack and quickly remove it. The sine force pulse may be used to compress and to expand gradually the stack of labels. The shape of the pulse when plotted on a graph of force versus time may be determined by the particular application of the pulsing system for the type of labels to be dispensed and the speed at which they are to be dispensed.

The pulsing of the compressive force on the stack of labels by forcing the pressure plate results in a stack of labels supported in the magazine which are not continually compressed to the point of compaction. Due to the elastic nature of the stack of labels label withdrawal operates with a minimum amount of external forces applied to the stack. In avoiding compaction of the stack this avoids a number of the difficulties in label withdrawal caused by the previously discussed problems in the label stack. Extensive compaction of the stack of labels as realized in prior art systems can result in inconsistent withdrawal of labels from the stack and may also result in tearing labels as they are compacted rather tightly against the ramps where their withdrawal from the ramp portions becomes very forceful.

It is appreciated that several alternatives are available in the application of this invention for example, the pulsing of the stack of labels may be used in combination with a device which continuously applies a minimal pressure on the pusher plate which is not sufficient to overcome the forces reacting against plate movement. This may be in the form of a coiled spring biasing the plate toward the discharge ramps. Such an arrangement would result in the pulsing force being sufficient to overcome the frictional forces in combination with the continually applied minimal force to provide the advance of the label stack. Another approach in providing pressure pulses is not to entirely remove the pressure from the pusher plate during the reduction of the force on the stack. This may be desirable in situations where complete relaxation of the stack of labels may result in misalignment of the labels; thus the force on the stack is reduced to a lower level but is not completely removed from the stack of labels. A further consideration is when the magazine is tilted upwardly so that gravitational forces constantly urge the stack downwardly. This may happen when the magazine and label applicator drums are tilted to apply labels to containers having a surface which tapers inwardly from top to bottom, i.e.: a negative slope. In this situation it is necessary to maintain a minimum force on the stack by the pusher plate after the pressure pulse which advances the stack to prevent the stack of labels under the influence of gravity from falling away from the discharge end of the magazine. Conversely when the magazine is tilted in the other direction to apply a label to a container having a surface which tapers inwardly from bottom to top, i.e.: a positive slope, the force after the pressure pulse is reduced to zero each time to allow the labels to expand against gravitational forces which tend to hold the stack of labels closer together than if the magazine were horizontal.

It is appreciated that alternative mechanisms may be used in providing the pulse force on the label stack; for example, an electronically controlled electric drive system may be provided which is connected to the pusher plate. An electronic controller may be devised which controls the electric drive in a manner to pulse the force on the pusher plate in the same manner as the pneumatic systems of FIGS. 4 through 7. Another alternative to the pneumatic system would be a completely mechanical system which by way of rotating cams and linkages provide a pulsing force on the pusher plate.

The system according to this invention which provides for a pulsating advance of the stack of labels improves the label withdrawal from the stack at high speeds of labelling. The compressing and expansion of the stack of labels permits maximum utilization of air blasts, particularly, the provision of air blasts alongside of the stack.

Although preferred embodiments of the invention have been described herein detail, it will be understood by those skilled in the art that variations may be made thereto without departing from the spirit of the invention or the scope of the appended claims.

The embodiments of the invention in which an exclusive property or privilege is claimed are defined as follows:

1. A label magazine adapted to hold a stack of labels and from which individual labels are withdrawn for application to articles by a labelling machine, said label magazine including a substantially stationary label supporting means comprising a base with label stack guide rails extending the length of the base and means for retaining a face of a stack of labels in the magazine, said retaining means comprising spaced parallel ramp portions extending upwardly from said base and adjustable to the width of a label to be retained, means for advancing such labels of the stack towards said retaining means, said advancement means comprising a plate slidably mounted for movement along said base, means for driving said plate towards said retaining means comprising a pneumatic piston and cylinder arrangement connected to a source of variable pressurized air controlled by a control means, said piston and cylinder arrangement having means for translating relative movement of said piston and cylinder to said plate, said retaining means being adapted to permit individual withdrawal of labels from the label stack as such labels are withdrawn from the stack of labels, said advancement means is adapted to cyclically compress the stack of labels and allow the compressed stack of labels to expand after each compression phase by said translator means causing said plate to advance towards said retaining means when said piston and cylinder arrangement is open to pressurized air to compress momentarily the stack of labels in said magazine, each said cycle including sufficient time to permit a compressed stack of labels to expand.

2. A label magazine of claim 1, wherein said control means controls the supply of pressurized air to said piston and cylinder arrangement to momentarily supply a predetermined level of pressurized air to said piston and cylinder arrangement which said translator means translates into a compressive force on the stack of labels to compress same by moving said plate toward said retaining means and to momentarily exhaust said piston and cylinder arrangement to remove pressure on the stack of labels to permit the stack of labels to expand.

3. A label magazine of claim 2, wherein said predetermined level of pressurized air is sufficient to overcome forces reacting against movement of said plate toward said retaining means.

4. A label magazine of claim 2, wherein said control means comprises a valve means which in a first position supplies pressurized air to said piston and cylinder arrangement, and which in a second position exhausts pressurized air from said piston and cylinder arrangement.

5. A label magazine of claim 4, wherein means is provided for timing the reciprocal movement of said valve means between its first and second positions.

6. A label magazine of claim 5, wherein said timing means comprises a pneumatic time delay circuit for moving said valve means from one position to the other.

7. A label magazine of claim 5, wherein said timing means comprises an electro-mechanical solenoid which is actuated cyclically to alternately shift said valve means between said first and second positions.

8. A label magazine of claim 5, wherein actuation of said electro-mechanical solenoid is effected by a rotating cam in combination with a switch.

9. A label magazine of claim 6, 7 or 8 wherein said means for timing said reciprocal movement is adjustable to determine the period of time said valve means is in each position.

* * * * *